Patented July 16, 1946

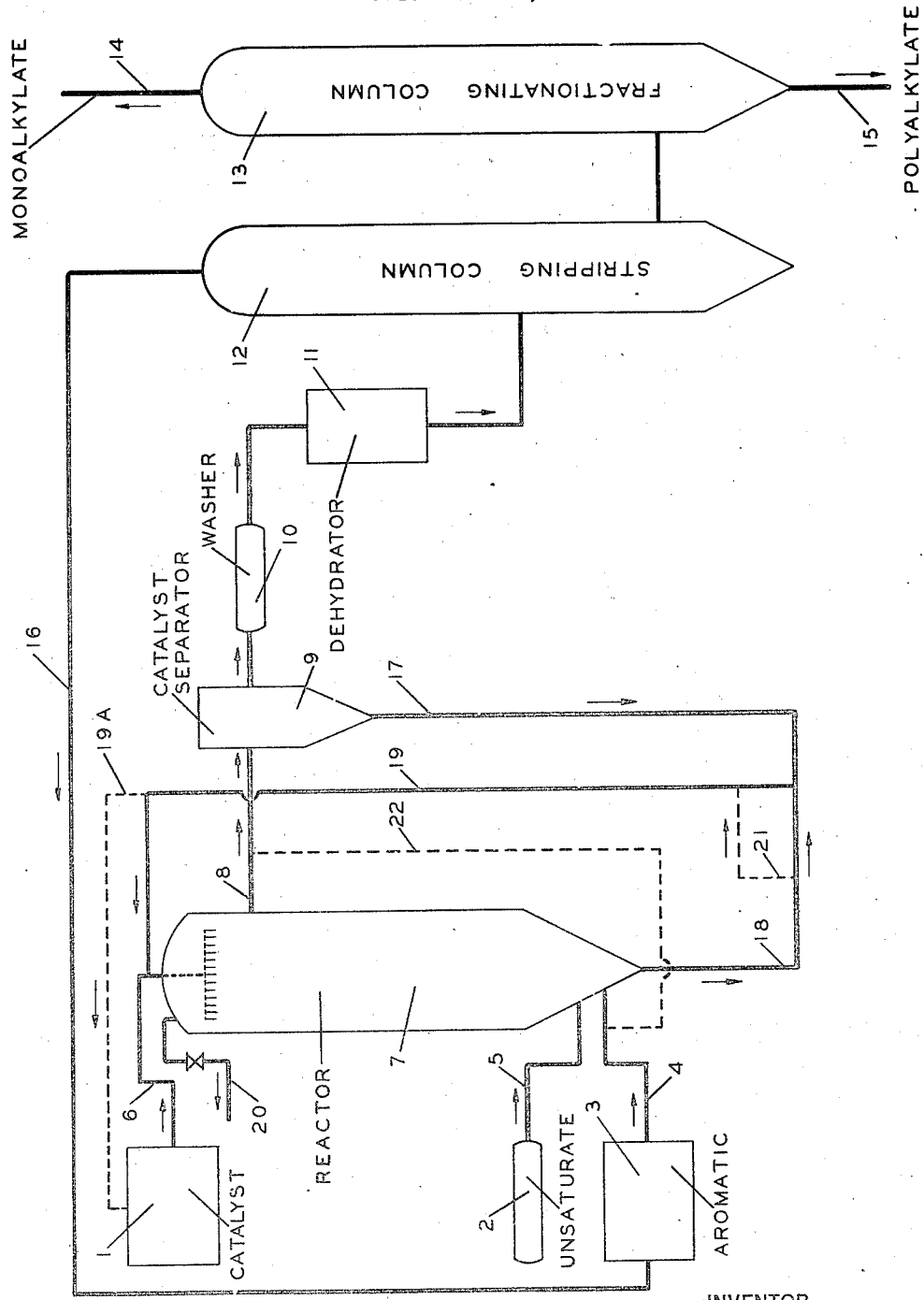

2,403,963

UNITED STATES PATENT OFFICE 2,403,963

ALKENYLATION PROCESS

William Nelson Axe, Bartlesville, Okla., assignor to Phillips Petroleum Company, a corporation of Delaware Application March 3, 1942, Serial No. 433,192

3 Claims. (Cl. 260—671)

The present invention relates to a new process for the alkylation of aromatic hydrocarbons with unsaturated hydrocarbons and refers more particularly to the use of a novel catalyst therein.

Except under extreme conditions of temperature and pressure alkylation processes in general require the presence of catalysts to produce appreciable reaction rates. Classical alkylation procedures involved the action of alkyl halides on aromatic hydrocarbons in the presence of aluminum chloride and similar compounds and/or catalysts of Friedel-Crafts type. In many instances it was found that alcohols could be used in place of the expensive alkyl halides. Since alkylation reactions take place under conditions favoring formation of olefins from the alcohols or alkyl halides, the present trend is toward the direct use of unsaturated hydrocarbons as the source of the alkyl radical. The alkyl radicals, in whatever form they may be employed, will undergo isomerization usually in various degrees with all the catalysts mentioned. Thus, propylene usually yields isopropyl derivatives in alkylation reactions.

The most frequently employed catalysts have been aluminum chloride, ferric chloride, zinc chloride and sulfuric acid. Although boron fluoride is predominantly a polymerization catalyst, it has been suggested for use in alkylation reactions. However, to employ this latter catalyst in alkylation reactions, high pressures have been considered essential together with promoting agents as finely divided metallic nickel, phosphorus pentoxide, etc.

An object of this invention is to provide a new process for the alkylation of aromatic hydrocarbons, particularly characterized by high yields of mono-alkylated products. Another object is to provide a novel catalytic agent for said alkylation reaction. Another object is to provide improvements in the reaction of benzene with low-boiling unsaturated hydrocarbons such as ethylene, propylene, butenes, butadiene, cyclohexene, etc. A further object is to provide a hydrated boron fluoride in which the mol ratio of water to boron fluoride is controlled within given limits to produce an effective catalyst for the alkylation reactions with which this invention is concerned. A still further object is to provide a process wherein aromatics may be alkylated by unsaturates at near-atmospheric temperatures and pressures. Further objects and advantages will appear hereinafter.

I have now discovered that the alkylation of aromatic hydrocarbons such as benzene and its homologs is very efficiently carried out in the presence of an alkylation catalyst comprising essentially hydrated boron fluoride in which the mol ratio of water to boron fluoride is controlled within certain critical limits. Catalysts prepared according to the present invention do not require the presence of a promoter and are active alkylation catalysts at moderate temperatures and at moderate pressures selected to conform to reaction requirements. The relative stability of this catalyst will allow the use of mechanical agitation in batch operation or in continuous counter-current operation involving catalyst recycle steps. Other advantages of said catalyst will be apparent from the examples cited.

I have found that the results obtained with my catalyst are far superior to those obtained by the use of boron fluoride alone. Under conditions used in my process, free boron fluoride had no appreciable activity when employed with benzene and propylene. Free boron fluoride dissolved in benzene obviously, then, is not the effective catalyst when hydrated boron fluoride catalyst is employed according to my invention. Without being limited to any particular theory, I believe that the activity of my catalyst is due to hydrated boron fluoride which is formed when boron fluoride is passed into water and which is relatively stable at the temperatures and pressures under which the process is operated.

The catalyst employed in my process is conveniently prepared by passing gaseous boron fluoride into water until the desired hydrate concentration is realized. The resulting hydrate is a liquid of relatively high specific gravity and substantially immiscible with hydrocarbons. During this reaction considerable heat is evolved and suitable means for cooling should be provided. Since the specific gravity of a completely saturated solution is approximately 1.77, convenient control of concentration can be effected by means of hydrometer determinations. Means for mechanical agitation of the absorbent liquid may be used, and I have found that such means are often helpful in obtaining some of the higher concentrations of the hydrate used in the process. In the preparation of the catalyst, the gaseous boron fluoride may be passed into water while the temperature is maintained below 150° F., and preferably above 75° F., until the water is saturated and boron fluoride passes through unabsorbed. At this point a water-boron fluoride mol ratio of approximately 1:1 is ordinarily obtained. The catalyst may be used in this form, or water may be added until a desired higher mol ratio is obtained; alternately, the addition of boron fluoride may be halted at the desired hydrate concentration by determination of the increase in weight or specific gravity of the liquid.

The alkylation of aromatic hydrocarbons can be carried out at near-atmospheric temperatures ordinarily not exceeding about 150° F. and at substantially atmospheric or low super-atmospheric pressures by the introduction of an unsaturated hydrocarbon into said aromatic hydrocarbon in the presence of my preferred catalysts. In batch operation, the catalyst may be suspended in a suitable reaction medium containing an aromatic hydrocarbon, and the unsaturated hydrocarbon or alkylating agent may be introduced at such flow rate that substantially complete reaction takes place. Low-boiling unsaturates may be introduced in vapor phase, while normally liquid materials may be added in liquid phase at a carefully controlled rate so as to produce the desired concentration. Control of the olefin is maintained so that the desired product will be predominant in the reaction products. If mono-alkylated products are desired, the olefin is added in such quantities that a definite excess of aromatic hydrocarbon is present in the reaction zone. In case of benzene and propylene it is preferred to employ a ratio in the reaction zone of at least about 1.2 to 1.5 mols of benzene per mole of propylene in order to obtain maximum yields of isopropyl benzene. A mol ratio greater than about 2 to 5 mols of benzene per mol of propylene does not greatly increase the yield of mono-alkylate and is unnecessarily expensive from an operating standpoint. A lower mol ratio of benzene to propylene, i. e., 1 to 1 or 0.5 to 1 will usually result in higher yields of poly-alkylated products. At the conclusion of the reaction as much of the catalyst as possible is removed by gravity separation and the product may be washed free of entrained catalyst and the alkylated product dried prior to fractional distillation.

The operation of my invention as a continuous process is described in the accompanying figure showing one arrangement of apparatus where the alkylation of benzene with propylene is considered. The reaction chamber 7 is filled with a ceramic packing. Propylene is pumped from tank 2 through line 5 to the bottom of the reaction zone. Benzene is pumped from storage tank 3 through line 4 to the bottom of the reaction zone. Lines 4 and 5 may be joined prior to entering the reactor, or both may be provided with valves to adjust the flow rate of propylene and benzene. It is preferable to proportion the flow of reactants ahead of the reactor so that a suitable mol ratio of aromatic to alkylating agent is maintained. The catalyst is pumped from storage vessel 1 through line 6 into the top of reactor 7, and flowing downward through the reaction zone contacts the benzene and propylene. The hydrocarbon stream is withdrawn from tower 7 through line 8 into catalyst separator 9 where the entrained catalyst is removed by gravity separation and returned for further use through lines 17 and 18. The product then passes to washer 10 where the last traces of the catalyst are removed and the wet hydrocarbon passes to the dehydrator 11, where the product is dried and then to column 12. Here the unreacted benzene is removed. The benzene-free product is finally fractionated in column 13 to yield the mono-alkylate or isopropyl benzene as the overhead product leaving through line 14 and poly alkylated benzene as the kettle product leaving through line 15. The unreacted benzene from column 12 is returned to the storage tank 3 through line 16 and may be used again in the process; any impurities returning with the benzene should be removed en route to tank 3. The catalyst is withdrawn from tower 7 through line 18 and joined with catalyst from separator 9 and recycled through line 19 to junction with line 6; or used catalyst may be diverted through line 21 and reactivated if necessary by means not shown. Alternately the entire amount of recovered catalyst may be returned to the supply vessel through line 19A. Also, in certain instances, a proportion of the hydrocarbon stream passing through line 8 and comprising benzene and alkylate may be recycled through line 22 to the bottom of tower 7. Substantially all of the propylene undergoes reaction, but any impurities such as propane are vented through line 20.

The catalyst compositions which are active in the process are those having a mol ratio of water to boron fluoride in the range of from about 1.0 to about 1.5, with the preferred ratio being from about 1.1 to about 1.5. Experiments have indicated that with catalysts having $H_2O:BF_3$ ratios above about 1.6 substantially no alkylation occurs and the olefins either pass through the reaction zone unreacted or are converted to high-boiling polymers. In Table I the results of batch alkylation of benzene with propylene using catalyst of various $H_2O:BF_3$ mol ratios show the critical effect of the water content of the catalyst on both the overall alkylation reaction and on the yield of monoalkylate. The per cent total alkylate (based on benzene) refers to the per cent of the benzene present which was alkylated either to mono- or poly-alkylated products. The per cent mono-alkylate refers to the per cent of the total alkylate obtained which was found to be mono-alkylated.

Table I

| Catalyst | | Yield, per cent | |
| --- | --- | --- | --- |
| $H_2O$-mols | $BF_3$-mols | Total alkylate (based on benzene) | Mono-alkylate |
| 1.1 | 1.0 | 87 | 71 |
| 1.2 | 1.0 | 90 | 84 |
| 1.3 | 1.0 | 94 | 87 |
| 1.4 | 1.0 | 97 | 90 |
| 1.5 | 1.0 | 98 | 92 |
| 1.6 | 1.0 | No appreciable yield of alkylate. | |

The temperatures for the experiments described in the above table were maintained in the range of 75 to 90° F. and identical proportions of the reactants and the same amount of catalyst were employed. These data indicate the alkylation is not induced at the conditions of the present process by catalysts with a $H_2O:BF_3$ ratio substantially above about 1.6. Also, it will be noted that the yield of mono-alkylate is somewhat larger with catalysts having a $H_2O:BF_3$ ratio greater than 1.1 and within the specified operative range.

The alkylation reactions in the presence of hydrated-boron fluoride catalyst may be carried out over a relatively wide range of temperatures and pressures, depending to a large extent on the aromatic hydrocarbon to be alkylated and the source and nature of the alkylating agent. In order to control the rate of alkylation and increase the proportion of mono-alkylated derivatives, temperatures are usually maintained at values within the range of about 50 to 150° F., with a somewhat narrower range of about 70 to 120° F. usually being preferred.

Pressures in the process are likewise selected in accordance with reaction requirements involving the relative ease and rate of alkylation, and are ordinarily low super-atmospheric pressure in the range of about atmospheric to about 100 pounds per square inch gage, although in certain instances still higher pressures may be helpful. For example, in alkylation reactions involving ethylene, somewhat higher pressures may be required to maintain higher concentration of the olefin in the reaction zone and hence increase the volume of alkylate product.

As indicated above, the reaction may be carried out with the liquid aromatic hydrocarbon serving as the reaction medium, since the concentration of the alkylating agent is maintained at relatively low values during alkylation. Or, the aromatic may be mixed with and/or dissolved in a suitable inert liquid diluent such as the paraffin or cycloparaffin hydrocarbons of 5 to 8 or more carbon atoms. The use of a solvent is of particular value in the alkylation of aromatic compounds such as naphthalene which are solid at operating temperatures.

The quantity of catalyst required to promote the alkylation of a given weight of aromatic hydrocarbon is dependent upon the ratio of water per mol of boron fluoride, ease of alkylation, and the degree of dispersion of the catalyst in the hydrocarbon to be alkylated. In some cases one part by weight of catalyst in 20 parts by weight of aromatic hydrocarbon liquid has been effective, whereas in other instances one part of catalyst to 4 parts of aromatic has been required to produce the desired rate of reaction.

During the process traces of gaseous boron fluoride are slowly transferred from the catalyst to the hydrocarbon thereby increasing the mol ratio of water to boron fluoride. However, this loss is so gradual that very large volumes of aromatic hydrocarbons may be alkylated before there is an appreciable decline in catalyst activity. In view of the specified operative range of the $H_2O:BF_3$ mol ratio and the gradual loss of boron fluoride, a longer period of operation may ordinarily be obtained by starting with a catalyst having a $H_2O:BF_3$ mol ratio near the lower limit. Spent catalyst ordinarily is withdrawn from the reactor and treated to remove hydrocarbons present before reactivation by known means.

Aromatic hydrocarbons including benzene and its homologs as well as fused benzene ring compounds and their homologs can be successfully alkylated by the process of the present invention. In general, aromatic hydrocarbons containing more than three alkyl substituents are not readily alkylated. The alkylating agents include the aliphatic unsaturated hydrocarbons and more particularly the members of the olefin and diolefin series. Cyclic non-aromatic unsaturates such as cyclo-olefins also may serve as the alkylating agent. The relatively mild reaction conditions and the specificity of the catalyst at the preferred operating conditions cause the alkylation reaction to take precedence over polymerization reactions to the extent of substantially preventing polymer formation.

I do not limit myself to any particularly theory or mode of operation with any specific hydrocarbon or catalyst composition except as herein defined. Other details as to procedure and advantages of my invention will be described in the following examples which are merely offered by way of illustration and without limiting the invention.

Example I

A catalyst comprising 1.5 mols of water to one mole of boron fluoride was prepared as follows:

20.0 cc. of water was put in a flask and immersed in an ice bath, and 22.6 liters of gaseous boron fluoride was bubbled slowly into the water until all of the gas was absorbed. The temperature was kept slightly above 75° F. To this solution sufficient water was added to give a ratio of 1.5 mols of water per mole of boron fluoride.

Example II

A catalyst consisting of 1.13 mols of water to one mol of boron fluoride was prepared as follows:

20 cc. of water was put into a flask which was provided with suitable means for cooling. Gaseous boron fluoride was bubbled slowly into the water until approximately 20 liters had been absorbed. From hydrometer determinations the specific gravity was found to be 1.7. Boron fluoride was added very slowly until the specific gravity was approximately 1.74.

Example III

Benzene was alkylated with propylene in the presence of a catalyst prepared according to Example I.

To 312 grams (4.0 mols) of benzene, 90 grams of catalyst comprising 1.5 mols of water to 1 mol of boron fluoride was added. The catalyst was dispersed in the benzene by moderate mechanical agitation. Propylene gas was introduced at a flow rate of 18.1 grams per hour until 158.5 grams (3.77 mols) were absorbed. The temperature was maintained between 77 and 81° F. Following the procedure outlined above to recover the catalyst and unreacted benzene, fractionation of the benzene-free alkylate yielded 83.2 per cent isopropyl-benzene and 16.8 per cent poly-alkylated benzenes.

Example IV

In this example benzene was alkylated with propylene at higher reaction temperatures, lower flow rate of propylene, and using less catalyst. Under these conditions the yield of mono-alkylate was greatly increased.

50 cc. of catalyst (83 grams) comprising 1.5 mols of water to one mol of boron fluoride was suspended by agitation in 312 grams of benzene. Propylene was introduced into the mixture at a flow rate of 17.6 grams per hour until 158.5 grams had been absorbed. The reaction temperature was maintained at 92–97° F. The product was treated with dilute sodium hydroxide, dried over solid caustic, and fractionated to recover unreacted benzene. The benzene-free alkylate was further fractionated to yield 92 per cent isopropylbenzene.

Example V

This example shows the greatly increased yield of mono-alkylate obtained from a continuous process operation over the batch process. The catalyst composition was 1.04 mols of water per mol of boron fluoride, which was prepared in a manner similar to that described in Example II. The specific gravity of this solution was 1.756.

53 cc. (92.5 grams) of the catalyst was suspended in 312 grams of benzene. Isobutene was charged at a flow rate of 20.3 grams per hour until 213 grams (3.8 mols) had been absorbed.

The temperature was maintained at 82 to 85° F. The alkylated product was treated as usual. Fractionation gave a 49.5 per cent yield of tertiary-butylbenzene. The kettle product comprised crystalline di-tertiary-butyl-benzene.

In a continuous operation, 50 cc. of catalyst comprising 1.04 mol of water to one mol of boron fluoride was charged to the reactor with approximately 600 cc. of benzene. Isobutylene was charged at a flow rate of 21 grams per hour, and 621 grams of isobutylene was absorbed during the total operation. Then, while isobutylene was added at the same rate, benzene was introduced at a flow rate of 140 grams per hour and the effluent was withdrawn at the rate of 200 cc. per hour. The catalyst was separated and recycled. The reaction temperature was 80 to 86° F. The alkylate effluent was treated as usual and yielded about 75 per cent mono-tertiary butylbenzene. The kettle product again was di-tertiary-butyl-benzene. There was no noticeable loss of catalyst activity after 30 hours.

*Example VI*

50 cc. of catalyst of composition comprising 1.5 mols of water to one mol of boron fluoride was suspended in 312 grams of benzene by agitation. Butadiene was introduced at a flow rate of 15 grams per hour until 150 grams had been absorbed. The reaction was carried out at 89 to 95° F. The alkylate was processed as above and the benzene-free alkylate was fractionated to yield 300 grams (85% yield) of phenyl-butenes boiling between 356 to 365° F.

*Example VII*

The alkylation of benzene with ethylene was carried out in a pressure vessel. 312 grams (4.0 mols) of benzene and 50 cc. (81 grams) of catalyst comprising 1.43 mols of water per mol of boron fluoride were charged to the bomb and ethylene gas was added until the pressure was 100 pounds. While the bomb was shaken to thoroughly mix the liquid phases, ethylene was supplied as needed to maintain the pressure. The reaction temperature was maintained between 90 and 100° F. After 3.5 mols of ethylene had been added, the contents were withdrawn, and the hydrocarbon liquid was fractionated to recover the alkylate. The product consisted mainly of mono- and di-ethylbenzene.

While the foregoing descriptive matter and examples have been relatively specific for the purpose of illustrating the novelty and important improvements of the present invention, numerous modifications and alternative operations will be apparent and, therefore, are considered within the scope of my disclosure. No limitations are implied except as recited in the following claims.

I claim:

1. A process for the reaction of benzene with butadiene to produce phenyl butenes, which comprises intimately contacting a hydrocarbon mixture comprising a major proportion of benzene and a minor proportion of butadiene with an alkylation catalyst comprising hydrated boron fluoride containing from about 1.0 to about 1.5 mols of water per mol of boron fluoride while maintaining a reaction temperature within the range of from about 70° F. to about 120° F. and a reaction pressure and recovering from effluents of said reaction as a product of the process a hydrocarbon fraction which consists mainly of phenyl-butenes.

2. A process for the production of phenyl butene, which comprises reacting benzene and butadiene at a reaction temperature within the range of about 50° F. to about 150° F., and with a substantial molar excess of benzene, in the presence of a complex resulting from reacting boron fluoride with about 1 to 1.5 molar equivalents of water, and recovering from effluents of said reaction a hydrocarbon fraction comprising phenyl butene so produced.

3. A process for the production of phenyl butene, which comprises reacting benzene and butadiene at a reaction temperature of 89 to 95° F., and with a substantial molar excess of benzene, in the presence, as a catalyst, of a complex resulting from reacting water and boron trifluoride in a molar ration of 1.5:1, and recovering from effluents of said reaction a hydrocarbon fraction comprising phenyl butene so produced.

WILLIAM NELSON AXE.